3,116,218
PROCESS FOR THE PRODUCTION OF PENICILLIN-SPLITTING ENZYME PREPARATIONS

Wilfried Kaufmann, Wuppertal-Vohwinkel, and Klaus Bauer, Wuppertal-Elberfeld, Germany, assignors to Farbenfabriken Bayer Aktiengesellschaft, Leverkusen, Germany, a corporation of Germany
No Drawing. Filed July 17, 1962, Ser. No. 210,582
9 Claims. (Cl. 195—36)

This invention relates, in general, to a new and improved process useful in the biosyntheses of penicillins. More particularly, the invention contemplates a unique process for increasing the enzymatic activity of certain so-called "penicillin-splitting" bacteria, that is, bacteria which are known to be useful in the production of synthetic penicillins by reason of their ability to enzymatically hydrolyze penicillins to 6-aminopenicillanic acid and phenylacetic acid.

Thus, by reference to our copending United States application Serial No. 22,086 which was filed on April 14, 1960, and is entitled "Biochemical Process," it has been proposed to produce 6-aminopenicillanic acid by permitting suspensions or extracts of select bacteria, which are capable of attacking the amide bond in the 6-position of the penicillin molecule, to act upon penicillins. In establishing the suitability of a bacterial mass to effect such splitting of the penicillin molecule, it is of importance to know the conditions under which the organisms are cultivated. Thus, by inoculating a nutrient solution with a suitable bacteria strain at a pH of 7.0, which solution, in addition to the ions required for actual culture of the microorganism, contains ammonium ions, hydrolyzed casein or meat peptone as the nitrogen-source, and glucose, lactose or saccharose as the energy- and carbon-source, a rather high yield of bacterial cell material can be obtained from the cultures under aeration at about 30° C., but the ability of the cells produced in this manner to effect splitting of the penicillin molecule is generally quite low. A limited increase in the desired enzymatic activity can be obtained through use of glycerol or salts of organic acids such as lactic acid or succinic acid as the energy- and carbon-source.

The present invention is based, in part, upon our discovery that the penicillin-splitting activity of at least certain bacteria can be substantially increased by cultivating the bacteria according to conventional techniques prior to subjecting them to the desired action with respect to the penicillin molecule, namely, under aeration in nutrient solutions substantially free of fermentable carbohydrates, but to which phenylacetic acid or a derivative of phenylacetic acid, at a concentration within the range of from 0.002 to 2 percent, is added during the growth cycle of the bacteria undergoing treatment.

Significantly, not all bacteria which possess penicillin-splitting properties can be enhanced in their enzymatic activity pursuant to the principles of our invention, but it is a relatively simple matter to determine the amenability of any given bacteria in this respect. Thus, in screening bacteria to establish their ability to be so enhanced in enzymatic activity, a nutrient medium substantially free of fermentable carbohydrates is inoculated with a bacterial strain selected from among those known to be capable of splitting the penicillin molecule to form 6-aminopenicillanic acid and phenylacetic acid. A specific screening technique for determining operative bacteria falling within this latter category is described in our aforementioned copending application, but, in general, it may be said that these include all bacteria capable of inactivating penicillin G by at least 20 percent within 24 hours to yield a solution in which said inactivated penicillin G can be at least partially reactivated by the addition of phenylacetyl chloride thereto. In accordance with our present invention, the culture of the bacteria being screened is incubated on a shaker at pH 7.0 for 20 hours at 30° C. Under exactly identical conditions of incubation, a separate culture of the same bacterial strain is incubated, but with the addition of 0.2 percent phenylacetic acid. Thereafter, 100 cubic centimeters of each of the separate culture broths are centrifuged. The bacteria are then resuspended in 20 milliliters of a phosphate buffer solution containing 50,000 units per milliliter of penicillin G. The suspensions are incubated at pH 7.0 for one hour at 37° C. Following this procedure, the residual anti-bacterial activity of the two separate reaction mixtures is estimated by conventional microbiological techniques. In accordance with this screening procedure, a bacterial strain suitable for use in the process of our present invention will become much more active in its penicillin-splitting capacity when cultured, initially, in the presence of phenylacetic acid. Organisms not suitable for use in the process are not activated by the addition of the phenylacetic acid to the culture medium, and, in point of fact, are sometimes even depressed in their normal enzymatic activity when cultured in the presence of phenylacetic acid.

On the basis of the foregoing screening technique, we have found, for example, that any of the bacteria *Escherichia coli*, *Proteus rettgeri* and Arthrobacter are ideally suited for use in the process of the invention, in that, the enzymatic activity of each can be appreciably increased by culturing in the presence of phenylacetic acid and derivatives of phenylacetic acid.

Bacterial cell masses of good penicillin-splitting capacity may be obtained through use in the preparation of the nutrient solution as the primary energy- and nitrogen-source, of amino-acid mixtures in the form of hydrolyzed protein or peptide mixtures, preferably in the form of peptones, or even higher molecular proteins. Advantageously, in addition to the inorganic ions commonly employed such as $SO_4^{--}$, $PO_4^{--}$, $Mg^{++}$, $K^+$, $Na$ and $Cl^-$, small quantities of a vitamin and growth factor mixture such as yeast water may be added to the nutrient solutions. In actual practice, however, we prefer to employ corn steep liquor as the principal ingredient of the nutrient medium, in that, it contains suitable energy- and nitrogen-sources, vitamins and growth factors, as well as the above-enumerated inorganic ions. To this basic nutrient solution, we add phenylacetic acid, phenyl acetamide, phenaceturic acid, phenacetyl-glutamic acid, or other suitable derivatives of phenylacetic acid.

The ability of the bacterial mass to split penicillin may be further improved by introducing into such cultures, during the growth of the bacteria, carbon dioxide, in addition to air. The carbon dioxide may be simply admixed with the air used as the oxygen source for the cultures, or it may be introduced into the growing cultures separately from the aeration. Generally, the temperature of the growing cultures is maintained within the range of from 20 to 45° C., and preferably the cultures are permitted to grow for from 12 to 20 hours at a temperature within the range of from 30 to 35° C. Following this period, the enzymatically activated bacterial cells are separated and washed, and may then be utilized directly to act upon penicillins.

Since the penicillin-splitting enzyme is closely attached to the cell wall of the bacteria and not to cytoplasmatic constituents of the cells, the enzymatic material produced in accordance with the process of the invention may be recovered from the penicillin-splitting mixtures by centrifuging after the desired biosynthetic action is completed, and it may then be reused for further batches.

It is believed that the invention may be best understood by reference to the following specific examples illustrating the modification of operative bacteria towards increasing their enzymatic activity in splitting the penicillin molecule. In Examples I and II, for control comparison, so phenylacetic acid was employed in the culture media, with the result that the yields are quite low, whereas Examples III–VII all illustrate the striking increase in enzymatic actvity that can be achieved in accordance with the process of our invention.

*Example I*

One hundred sixty (160) liters of a 2 percent by volume solution of corn steep liquor was adjusted with KOH to a pH of 7.0 and heated to 120° C. for 30 minutes. After cooling, the solution was clarified by centrifuging and, following the addition of 0.5 percent glucose, sterilized at 110° C. for 40 minutes in a fermentation vessel. After cooling, this nutrient solution was inoculated with 400 cubic centimeters of an 18 hour-shake culture of *Escherichia coli* ATCC 11105. The batch was then aerated with 150 liters per minute of air at 115 revolutions per minute of the agitator, and cultivated at 31° C. for 17 hours.

The bacterial cells were separated from the nutrient solution by centrifuging, washed in 16 liters of a $1/15$ M phosphate buffer solution at a pH of 6.0 and, after centrifuging, resuspended in 16 liters of a $1/5$ M phosphate buffer solution at a pH of 7.0. Dry penicillin G was dissolved in this suspension up to a concentration of 5000 units per milliliter, and 0.4 percent of toluene was added. The batch was kept at 37° C. for 12 hours and still contained after this time 4200 units of penicillin G per milliliter of suspension. A filtrate of a sample of the suspension was reacted with phenylacetyl chloride according to known methods and could be reactivated up to 4850 units of penicillin G per milliliter of suspension.

*Example II*

One hundred sixty (160) liters of a solution of sterile corn steep liquor, prepared according to Example I, but without the addition of glucose, was inoculated with 400 cubic centimeters of an 18-hour-shake culture of *Escherichia coli* ATCC 11105. The batch was aerated with 150 liters per minute of air at 150 revolutions per minute of the agitator, and cultured at 31° C. for 17 hours.

The bacterial cells were separated from the nutrient solution by centrifuging, washed in 16 liters of $1/15$ M phosphate buffer solution at a pH of 6.0 and, after centrifuging, resuspended in 16 liters $1/5$ M phosphate buffer solution at a pH of 7.0. Dry penicillin G was dissolved in this suspension up to a concentration of 5000 units/ cubic centimeter, and 0.4 percent toluene was added. The batch was kept at 37° C. for 5 hours and still contained after this time 600 units of penicillin G per milliliter of suspension. The filtrate of a sample of this suspension was reacted with phenylacetyl chloride according to conventional methods, and could be reactivated up to 4650 units of penicillin G per milliliter of suspension.

*Example III*

One hundred sixty (160) liters of a sterile solution of corn steep liquor prepared according to Example II, but with the addition of 0.2 percent of potassium phenylacetate was inoculated with 400 cubic centimeters of an 18 hour-shake culture of *Escherichia coli* ATCC 11105. The batch was aerated with 150 liters per minute of air at 150 revolutions per minute of the agitator, and cultivated at 31° C. for 17 hours.

The bacterial cells were separated from the nutrient solution by centrifuging, washed in 16 liters of a $1/15$ M phosphate buffer solution at a pH of 6.0 and, after centrifuging, resuspended in 16 liters of $1/5$ M phosphate buffer solution at a pH of 7.0. Dry penicillin G was dissolved in this suspension up to a concentration of 10,000 units per milliliter, and 0.4 percent of toluene was added. The batch was kept at 30° C. for 5 hours and was then found to contain 1500 units of penicillin G per milliliter of suspension. The filtrate of a sample of this suspension was reacted with phenylacetyl chloride according to known methods and could be reactivated up to 9500 units of penicillin G per milliliter of suspension.

*Example IV*

One hundred sixty (160) liters of a sterile solution of corn steep liquor prepared according to Example II, but with the addition of 0.2 percent of potassium phenylacetate was inoculated with 400 cubic centimeters of an 18 hour-shake culture of *Escherichia coli* ATCC 11105. The batch was aerated with 150 liters per minute of air at 150 revolutions per minute of the agitator, and cultivated at 31° C. for 17 hours at normal pressure. During the whole period of growth 5 liters of carbon dioxide per minute were introduced into the culture through a conduit which was separated from the air conduit of the fermentation vessel.

The bacterial cells were separated from the nutrient solution by centrifuging, washed in 16 liters of a $1/15$ M phosphate buffer solution at a pH of 6.0 and, after renewed separation, resuspended in 16 liters of a $1/5$ M phosphate buffer solution at a pH of 7.5 containing 100,000 units of penicillin G per milliliter, and 0.4 percent of toluene. The batch was kept at 30° C. for 7 hours. During this period the pH value of the reaction mixture, decreasing to the acid range by the phenylacetic acid enzymatically split off from the penicillin molecule, was maintained between 7.0 to 7.5 by repeated additions of a concentrated $Na_2CO_3$ solution. After a reaction of 7 hours, the batch was found to contain 12000 units of penicillin G per milliliter of suspension. The filtrate of a sample of this suspension was reacted according to known methods with phenylacetyl chloride, and could be reactivated up to 91,000 units of penicillin G per milliliter of suspension.

The 6-aminopenicillanic acid formed in this batch was isolated as a colorless crystalline powder in good yield.

*Example V*

One hundred sixty (160) liters of a sterile nutrient solution of corn steep liquor prepared as described in Example II, but with the addition of 0.2% of potassium phenylacetate was inoculated with 400 cubic centimeters of an 18 hour-shake culture of *Escherichia coli* ATCC 9637. The batch was aerated with 150 liters of air per minute at 150 revolutions per minute of the agitator, and cultivated at 31° C. for 17 hours at normal pressure. During the whole period of growth, 10 liters per minute of carbon dioxide were introduced into the culture through a conduit separated from the air conduit of the fermentation vessel.

The bacterial cells were separated from the nutrient solution by centrifuging, washed in 16 liters of a $1/15$ M phosphate buffer solution at a pH of 6.0 and, after renewed separation, resuspended at a pH of 7.5 in 16 liters of a $1/5$ M phosphate buffer solution containing 50,000 units of penicillin G/cubic centimeter and 0.4 percent of toluene. The batch was kept at 30° C. for 3 hours. During this period, the pH value of the reaction mixture, decreasing to the acid range by the phenylacetic acid enzymatically split off from the penicillin molecule, was maintained between 7.0 to 7.5 by repeated additions of a concentrated $Na_2CO_3$ solution. After a reaction of 3 hours, the batch was found to contain 4700 units of penicillin per milliliter of suspension. The filtrate of a sample of this suspension was reacted according to known methods with phenylacetyl chloride, and could be reactivated up to 46,500 units of penicillin G per milliliter of suspension.

The 6-aminopenicillanic acid formed in this batch was also isolated as a colorless crystalline powder in good yield.

Example VI 160 liters of a nutrient solution containing

1% of a casein hydrolyzate
0.1% $K_2HPO_4$
0.03% $MgSO_4$, and
0.20% potassium phenylacetate were sterilized during 40 minutes at 110° C. in the fermenter, and, after cooling, inoculated with 400 cubic centimeters of a *Proteus rettgeri* culture shaken 18 hours. The starting charge was then aerated with 150 liters of air per minute, at a stirrer speed of 150 r.p.m.

For testing the enzymatic activity, the bacterial cells were separated from the culture solution by centrifugation, washed in 16 liters of a 0.9%-NaCl solution, and, after centrifugation, resuspended in 16 liters of a $\frac{1}{15}$ N-phosphate buffer solution of pH 7.5 containing 50,000 I. units of penicillin G/cubic centimeter and 0.4% of toluene. The test solution was held 4 hours at 40° C. During this time the pH of the reaction mixture was held between pH 7.5 and 8.0 by repeated additions of a $Na_2CO_3$ solution. After a reaction lasting 4 hours the charge was found to contain 3000 I. units of penicillin G per cubic centimeter. The filtrate of a specimen of this suspension was reacted according to known methods with phenylacetyl chloride, and could be reactivated up to 43000 I. units of penicillin G per cubic centimeter.

Example VII

To 160 liters of a 2 percent (by vol.) maize solution in spring water were added 3 percent of phenylacetyl glutamic acid; the pH adjusted to 7.0 with KOH, and the resulting solution was then heated for 30 minutes at 120° C.

After cooling, the solution was clarified by centrifugation and sterilized in the fermenter over 40 minutes at 110° C. After cooling, this nutrient solution was inoculated with 400 cubic centimeters of a shaken 24-hour culture of an Arthrobacter strain (NRRL B–2743) isolated from the soil. The starting solution was then aerated with 150 liters of air per minute at a stirrer speed of 150 r.p.m., and cultivated for 22 hours at 25° C.

For testing the enzymatic activity of the bacterial cells obtained from this culture, the procedure outlined in Example II was followed, but with a penicillin G concentration of 25000 I. units per cubic centimeter of the reaction mixture. After a 5-hour reaction period, the batch was found to contain 2000 I. units of penicillin G per cubic centimeter in suspension. The filtrate of a specimen of this suspension was reacted with phenylacetyl chloride according to known methods and could be reactivated up to 21,000 I. units of penicillin G per cubic centimeter.

What is claimed is:

1. A process for producing penicillin-splitting enzyme preparations that comprises, cultivating a penicillin-splitting bacterial strain selected from the group consisting of *Escherichia coli, Proteus rettgeri* and Arthrobacter NRRL B–2743 under aerobic conditions at a pH of about 7 and at a temperature from about 20° C. to about 45° C. within a nutrient medium comprising a source of nitrogen, inorganic ions and from about 0.002 to about 2 percent of a phenylacetic acid derivative selected from the group consisting of phenylacetic acid, phenyl acetamide, phenylaceturic acid and phenacetyl-glutamic acid, said nutrient medium being substantially free of fermentable carbohydrates, and recovering the bacterial cells from said nutrient medium.

2. A process for producing penicillin-splitting enzyme preparations that comprises, cultivating a penicillin-splitting bacterial strain selected from the group consisting of *Escherichia coli, Proteus rettgeri* and Arthrobacter NRRL B–2743 under aerobic conditions at a pH of about 7 and at a temperature from about 20° C. to about 45° C. within a nutrient medium comprising corn steep liquor and from about 0.002 to about 2 percent of a phenylacetic acid derivative selected from the group consisting of phenylacetic acid, phenyl acetamide, phenylaceturic acid and phenacetyl-glutamic acid, said nutrient medium being substantially free of fermentable carbohydrates, and recovering the bacterial cells from said nutrient medium.

3. A process for producing penicillin-splitting enzyme preparations that comprises, cultivating a penicillin-splitting bacterial strain selected from the group consisting of *Escherichia coli, Proteus rettgeri* and Arthrobacter NRRL B–2743 under aerobic conditions at a pH of about 7 and at a temperature from about 20° C. to about 45° C. within a nutrient medium comprising corn steep liquor, carbon dioxide and from about 0.002 to about 2 percent of a phenylacetic acid derivative selected from the group consisting of phenylacetic acid, phenyl acetamide, phenylaceturic acid and phenacetyl-glutamic acid, said nutrient medium being substantially free of fermentable carbohydrates, and recovering the bacterial cells from said nutrient medium.

4. A process for producing penicillin-splitting enzyme preparations that comprises cultivating under aerobic conditions at a pH of about 7 and at a temperature of from about 20° C. to about 45° C. a penicillin-splitting bacterial strain of *Escherichia coli* in a nutrient medium comprising corn steep liquor, carbon dioxide and from about 0.002 to about 2% of a phenyl acetic acid derivative selected from the group consisting of phenylacetic acid, phenyl acetamide, phenylaceturic acid and phenacetyl-glutamic acid, said nutrient medium being substantially free of fermentable carbohydrates, and recovering the bacterial cells from said nutrient medium.

5. A process for producing penicillin-splitting enzyme preparations that comprises cultivating under aerobic conditions at a pH of about 7 and at a temperature of from about 20° C. to about 45° C. a penicillin-splitting bacterial strain of *Escherichia coli* ATCC 11105 in a nutrient medium comprising corn steep liquor, carbon dioxide and from about 0.002 to about 2% of a phenyl acetic acid derivative selected from the group consisting of phenylacetic acid, phenyl acetamide, phenyl aceturic acid and phenacetyl-glutamic acid, said nutrient medium being substantially free of fermentable carbohydrates, and recovering the bacterial cells from said nutrient medium.

6. A process for producing penicillin-splitting enzyme preparations that comprises cultivating under aerobic conditions at a pH of about 7 and at a temperature of from about 20° C. to 45° C. a penicillin-splitting bacterial strain of *Escherichia coli* ATCC 9637 in a nutrient medium comprising corn steep liquor, carbon dioxide and from about 0.002 to about 2% of a phenyl acetic acid derivative selected from the group consisting of phenyl acetic acid, phenyl acetamide, phenyl aceturic acid and phenacetyl-glutamic acid, said nutrient medium being substantially free of fermentable carbohydrates, and recovering the bacterial cells from said nutrient medium.

7. A process for producing penicillin-splitting enzyme preparations that comprises cultivating under aerobic conditions at a pH of about 7 and at a temperature of from about 20° C. to about 45° C. a penicillin-splitting bacterial strain of *Proteus rettgeri* in a nutrient medium comprising corn steep liquor, carbon dioxide and from about 0.002 to about 2% of a phenyl acetic acid derivative selected from the group consisting of phenylacetic acid, phenyl acetamide, phenyl aceturic acid and phenacetyl-glutamic acid, said nutrient medium being substantially free of fermentable carbohydrates, and recovering the bacterial cells from said nutrient medium.

8. A process for producing penicillin-splitting enzyme preparations that comprises cultivating under aerobic conditions at a pH of about 7 and at a temperature of from about 20° C. to about 45° C. a penicillin-splitting bacterial strain of Arthrobacter NRRL B–2743 in a nutrient medium comprising corn steep liquor, carbon dioxide and from about 0.002 to about 2% of a phenyl acetic acid derivative selected from the group consisting of phenylacetic acid, phenyl acetamide, phenyl aceturic acid and phenacetyl-glutamic acid, said nutrient medium being substantially free of fermentable carbohydrates, and recovering the bacterial cells from said nutrient medium.

9. A process for producing penicillin-splitting enzyme preparations that comprises cultivating under aerobic conditions at a pH of about 7 and at a temperature of from about 20° C. to about 45° C. a penicillin-splitting bacterial strain of Arthrobacter NRRL B–2743 in a nutrient medium comprising corn steep liquor, carbon dioxide and from about 0.002 to about 2% of a phenyl acetic acid derivative selected from the group consisting of phenylacetic acid, phenyl acetamide, phenyl aceturic acid and phenacetyl-glutamic acid, said nutrient medium being substantially free of fermentable carbohydrates, and recovering the bacterial cells from said nutrient medium.

References Cited in the file of this patent

UNITED STATES PATENTS 2,423,873     Coghill et al. _____ July 15, 1947